(12) United States Patent
Kawaguchi et al.

(10) Patent No.: US 12,065,200 B2
(45) Date of Patent: Aug. 20, 2024

(54) DRIVE DEVICE

(71) Applicant: DENSO CORPORATION, Kariya (JP)

(72) Inventors: Go Kawaguchi, Kariya (JP); Yukio Horiba, Kariya (JP)

(73) Assignee: DENSO CORPORATION, Kariya (JP)

( * ) Notice: Subject to any disclaimer, the term of this patent is extended or adjusted under 35 U.S.C. 154(b) by 401 days.

(21) Appl. No.: 17/376,422

(22) Filed: Jul. 15, 2021

(65) Prior Publication Data

US 2021/0339794 A1 Nov. 4, 2021

Related U.S. Application Data

(63) Continuation of application No. PCT/JP2020/001023, filed on Jan. 15, 2020.

(30) Foreign Application Priority Data

Jan. 18, 2019 (JP) .................... 2019-006524

(51) Int. Cl.
*B62D 5/04* (2006.01)
*H02K 5/10* (2006.01)
*H02K 5/22* (2006.01)

(52) U.S. Cl.
CPC .......... *B62D 5/0406* (2013.01); *B62D 5/0424* (2013.01); *H02K 5/10* (2013.01); *H02K 5/225* (2013.01)

(58) Field of Classification Search
CPC ...... B62D 5/0406; B62D 5/0424; H02K 5/10; H02K 5/225
See application file for complete search history.

(56) References Cited

U.S. PATENT DOCUMENTS

| | | | |
|---|---|---|---|
| 2013/0099611 A1 | 4/2013 | Suga et al. | |
| 2016/0065031 A1* | 3/2016 | Yamada | H02K 5/225 310/71 |
| 2016/0233737 A1* | 8/2016 | Nakamura | H02K 11/33 |
| 2017/0158223 A1* | 6/2017 | Abe | H02K 5/10 |
| 2017/0291635 A1 | 10/2017 | Yamasaki | |
| 2019/0126973 A1 | 5/2019 | Yamasaki | |

FOREIGN PATENT DOCUMENTS

JP H10-189156 A 7/1998

\* cited by examiner

*Primary Examiner* — Tulsidas C Patel
*Assistant Examiner* — Mohammed Ahmed Qureshi
(74) *Attorney, Agent, or Firm* — MASCHOFF BRENNAN

(57) ABSTRACT

A drive device includes a motor, a control unit, a connector unit, a cover, and a seal member. The control unit is arranged coaxially with the motor and configured to control a drive of the motor. The connector unit connects the control unit to an external connector. The cover is a member separate from the connector unit and covers the control unit. The seal member is provided between the connector unit and the cover.

8 Claims, 13 Drawing Sheets

DRIVE DEVICE

CROSS REFERENCE TO RELATED APPLICATIONS

The present application is a continuation application of International Patent Application No. PCT/JP2020/001023 filed on Jan. 15, 2020, which designated the U.S. and claims the benefit of priority from Japanese Patent Application No. 2019-006524 filed on Jan. 18, 2019. The entire disclosures of all of the above applications are incorporated herein by reference.

TECHNICAL FIELD

The present disclosure relates to a drive device.

BACKGROUND

A drive device, in which a motor and a control device for controlling the motor are integrally provided, has been proposed. For example, a drive device used for an electric power steering apparatus is known. The drive device includes a motor having two winding sets. The control device includes a control unit having an inverter corresponding to each winding set. The control device further includes a connector unit for connecting the control unit to the outside.

SUMMARY

The present disclosure provides a drive device. The drive device includes a motor, a control unit, a connector unit, a cover, and a seal member. The control unit is arranged coaxially with the motor and configured to control a drive of the motor. The connector unit connects the control unit to an external connector. The cover is a member separate from the connector unit and covers the control unit. The seal member is provided between the connector unit and the cover.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
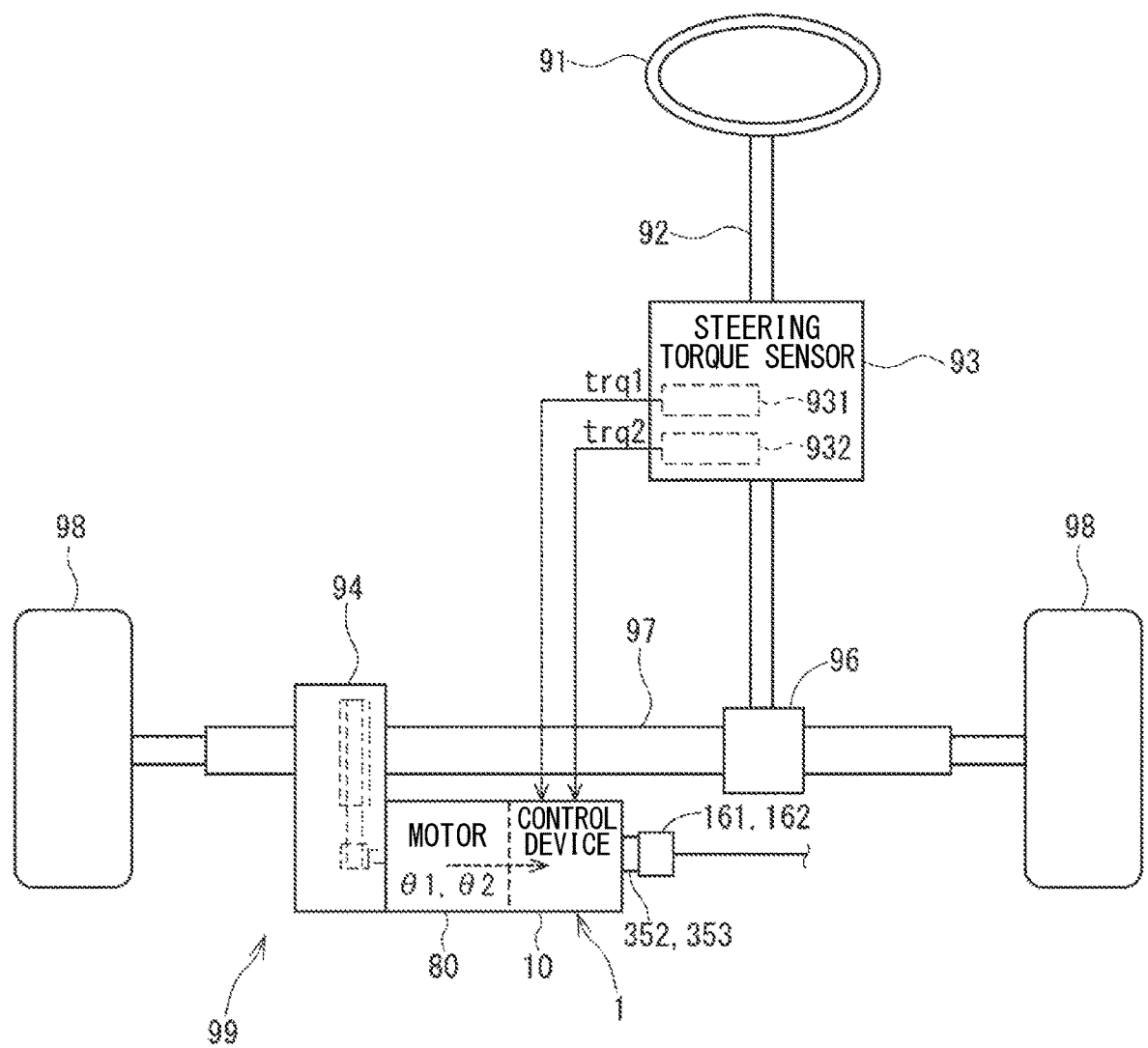
FIG. 1 is a configuration view of an electric power steering device to which a drive device of each embodiment is applied.

When the number of terminals of a connector unit in a control device of a drive device is increased, an extra space for arranging the increased terminals is required. Thus, the size of the connector unit increases. As a result, there is a difficulty that the size of the control device in the radial direction increases and mountability of the drive device decreases.

The present disclosure provides a drive device of which an increase in a size in a radial direction is suppressed.

An exemplary embodiment of the present disclosure provides a drive device. The drive device includes a motor, a control unit, a connector unit, a cover, and a seal member. The control unit is arranged coaxially with the motor and configured to control a drive of the motor. The connector unit connects the control unit to an external connector. The cover is a member separate from the connector unit and covers the control unit. The seal member is provided between the connector unit and the cover. The connector unit includes a base portion, a connector portion, and a connector fixing portion. The connector portion has a connection opening for the external connector. The connector fixing portion fixes the base portion. A direction parallel to a rotation axis of the motor is defined as an axial direction. A direction orthogonal to the rotation axis is defined as a radial direction. The base portion has a shape, in a plane orthogonal to the axial direction, elongated in a predetermined direction. The connector fixing portion protrudes outward from the base portion in the radial direction within an angle range of ±45° around the rotation axis with respect to a short axis of the base portion in the plane.

In the exemplary embodiment of the present disclosure, by arranging the connector fixing portion outside of the seal member, the inside of the cover can be made a waterproof structure.

Further, the terminal arrangement space is increased by the base portion having the shape elongated, and the connector fixing portion is arranged closer to the short axis than the long axis. With this configuration, the entire connector unit can be accommodated in the circular shape. Therefore, even when the number of terminals of the connector unit increases, the configuration can suppress an increase in the size of the radial direction of the drive device.

Hereinafter, a plurality of embodiments of a drive device will be described with reference to the drawings. In the embodiments, components which are substantially similar to each other are denoted by the same reference numerals and redundant description thereof is omitted. The drive device is applied to an electric power steering device of a vehicle and outputs steering assist torque.

First, a configuration of the electric power steering device, which is a matter common to each embodiment, will be described with reference to FIGS. 1 to 3. FIG. 1 shows an overall configuration of a steering system 99 including an electric power steering device 90. Although the electric power steering device 90 in FIG. 1 is a rack assist type, the electric power steering device 90 may be a column assist type.

The steering system 99 includes a steering wheel 91, a steering shaft 92, a pinion gear 96, a rack shaft 97, road wheels 98, the electric power steering device 90 and the like. The steering shaft 92 is connected to the steering wheel 91. The pinion gear 96 provided at an end of the steering shaft 92 engages with the rack shaft 97. A pair of wheels 98 are provided at both ends of the rack shaft 97 via, for example, tie rods. When the driver rotates the steering wheel 91, the steering shaft 92 rotates. A rotational movement of the steering shaft 92 is converted into a linear movement of the rack shaft 97 by the pinion gear 96. The pair of wheels 98 is steered to an angle corresponding to the displacement amount of the rack shaft 97.

The electric power steering device 90 includes a steering torque sensor 93, a control device 10, a motor 80, a speed reducer 94, and the like. The steering torque sensor 93 is provided at an intermediate portion of the steering shaft 92 to detect a steering torque applied by the driver. In the embodiment shown in FIG. 1, the steering torque sensor 93 is a dual type, which includes a first torque sensing element 931 and a second torque sensing element 932, and detects a first steering torque trq1 and a second steering torque trq2, respectively, in a dual manner. In case that the steering torque sensing elements are not provided in redundancy, a detected value of one steering torque trq may be used in common for two systems.

The control device 10 acquires the steering torques trq1 and trq2 detected by the steering torque sensor 93 and the electrical angles θ1 and θ2 of the motor 80 detected by the rotation angle sensor. The control device 10 controls the drive of the motor 80 so that the motor 80 generates a desired assist torque based on the steering torque, the electrical angle, and information such as the motor current detected inside the control device 10. The assist torque generated by the motor 80 is transmitted to the rack shaft 97 via the speed reducer 94.

The control device 10 is integrally formed on one side of the motor 80 in the axial direction. The motor 80 and the control device 10 configure a drive device 1 of an electro-mechanical integrated type. In the configuration shown in FIG. 1, the control device 10 is arranged coaxially with the motor 80 on the side opposite to an output side of the motor 80. In another embodiment, the control device 10 may be arranged coaxially with the motor 80 on the output side of the motor 80.

Figure 2:
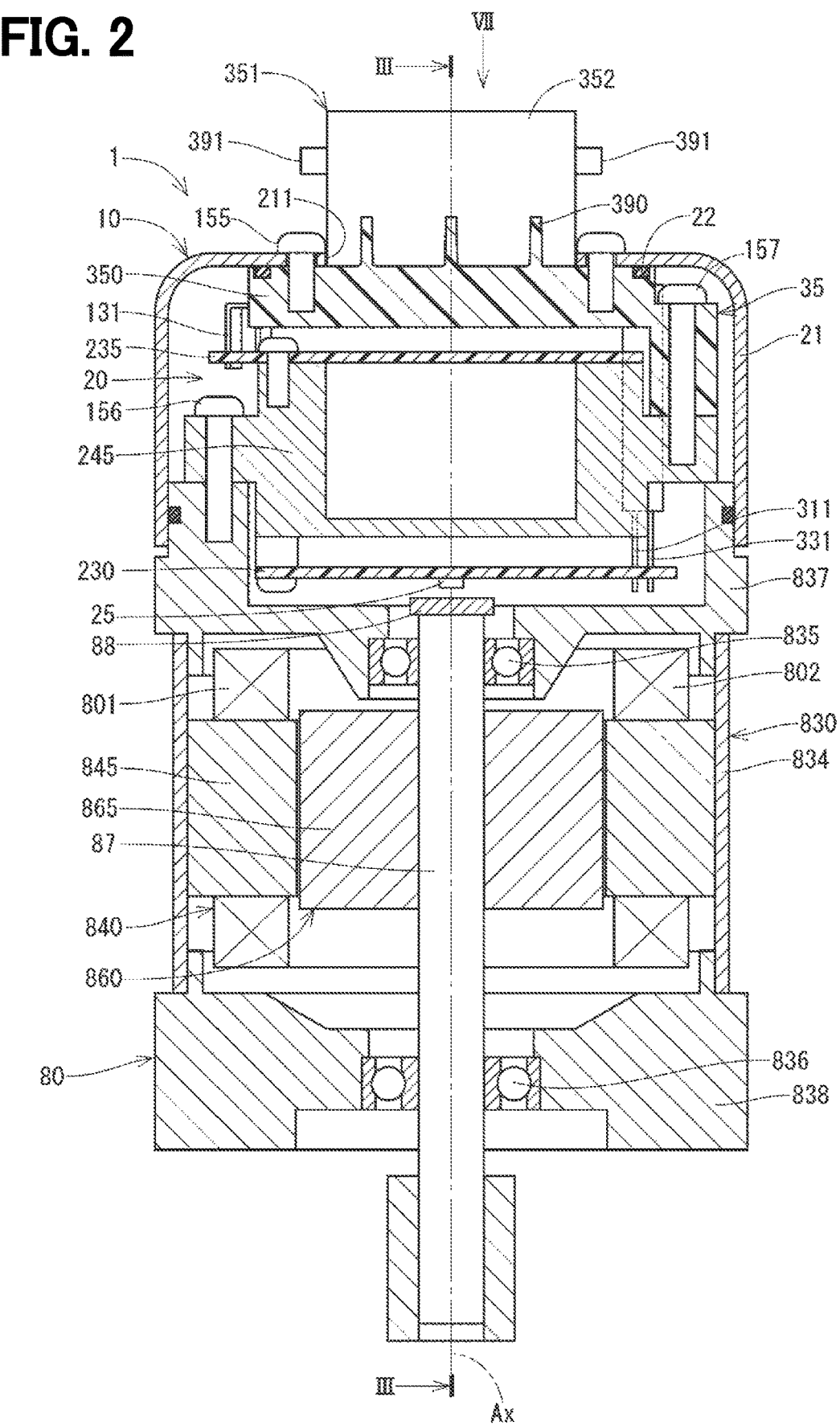
FIG. 2 is a vertical cross-sectional view of the drive device.
Figure 3:
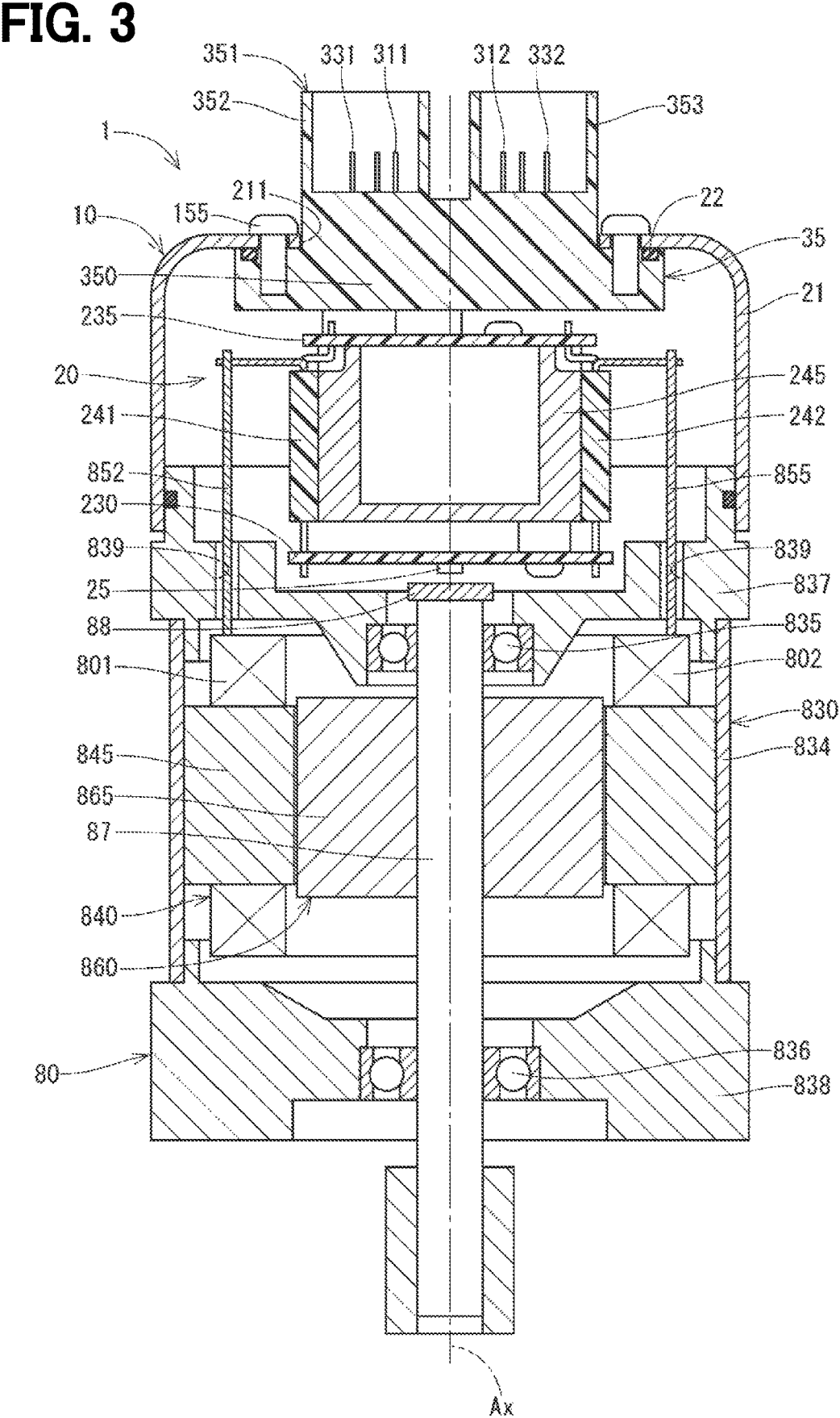
FIG. 3 is a cross sectional view taken along the line III-III of FIG. 2.

As shown in FIGS. 2 and 3, the motor 80 is a three-phase brushless motor and includes a stator 840, a rotor 860, and a housing 830 that houses them. The stator 840 has a stator core 845 fixed to the housing 830 and first and second three-phase winding sets 801, 802 assembled to the stator core 845. Lead wires 851, 853 and 855 extend from each phase winding forming the first winding set 801. Lead wires 852, 854, and 856 extend from each phase winding forming the second winding set 802.

The rotor 860 has a shaft 87, which is supported by a rear bearing 835 and a front bearing 836, and a rotor core 865, into which the shaft 87 is firmly fitted. The rotor 860 is provided radially inside the stator 840 to be rotatable relative to the stator 840. A permanent magnet 88 is provided at one axial end of the shaft 87.

The housing 830 has a cylindrical case 834, a rear frame end 837 provided at one end of the case 834, and a front frame end 838 provided at the other end of the case 834. The rear frame end 837 and the front frame end 838 are fastened to each other by bolts or the like. The lead wires 851, 852 of each winding set 801, 802 are connected to the control device 10 through the lead wire insertion holes 839 of the rear frame end 837.

Figure 4:
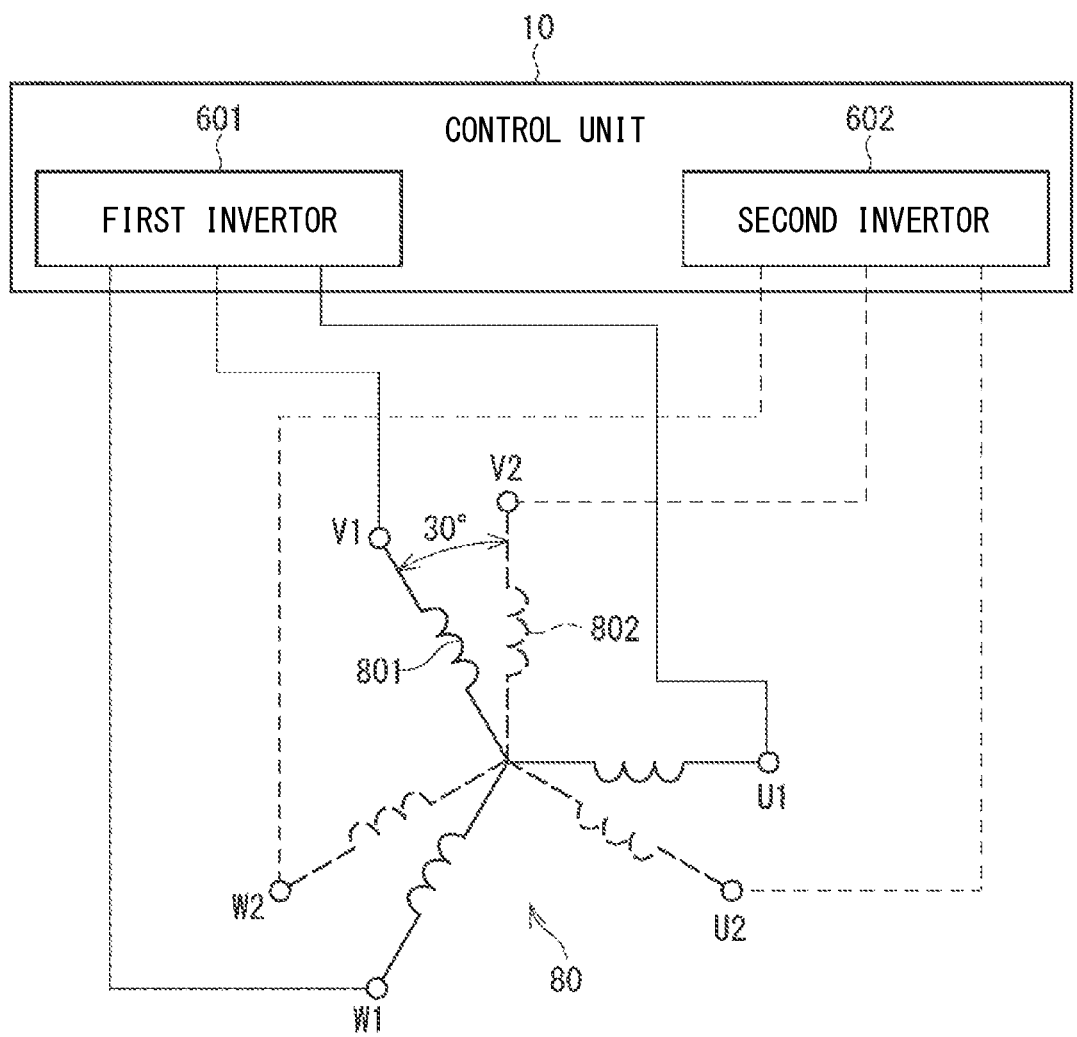
FIG. 4 is a schematic view showing a configuration of a multi-phase coaxial motor.

As shown in FIG. 4, the winding sets 801 and 802 have the same electrical characteristics and are wound on a common stator core 845 while being shifted from each other by an electrical angle of 30 degrees.

First Embodiment

Next, the configuration of the drive device 1 of the first embodiment will be described with reference to FIGS. 2 to 7. As shown in FIGS. 2 and 3, the control device 10 includes a control unit 20, a cover 21, a connector unit 35, and a seal member 22. The cover 21 covers the control unit 20. The connector unit 35 causes the control unit 20 to be connected to external connectors 161 and 162 (see FIG. 1). The seal member 22 is provided between the connector unit 35 and the cover 21. Each of the external connectors 161 and 162 is a connector for an external cable. The cover 21 protects the control unit 20 from an external impact and inhibits dust, water, and the like from entering the control unit 20.

The control unit 20 includes a heat sink 245 fixed to the rear frame end 837, circuit boards 230 and 235 and power modules 241 and 242 fixed to the heat sink 245, and various electronic components mounted on the circuit boards 230 and 235. In FIGS. 2 and 3, electronic components are not shown. The electronic components will be described later with reference to FIGS. 5 and 6. The power modules 241 and 242 include switching elements described later, and the switching elements are connected to lead wires 852 and 856 of the winding sets 801 and 802 and the like. The heat sink 245 is provided between the rear frame end 837 and the connector unit 35 in the cover 21, and is fixed by a screw 156. The circuit board 230 is provided at a position facing the rear frame end 837. The circuit board 235 is provided at a position facing the connector unit 35. On the circuit boards 230 and 235, the electronic components of first and second systems are mounted independently for each system so that the two systems are provided in a redundant configuration.

Figure 5:
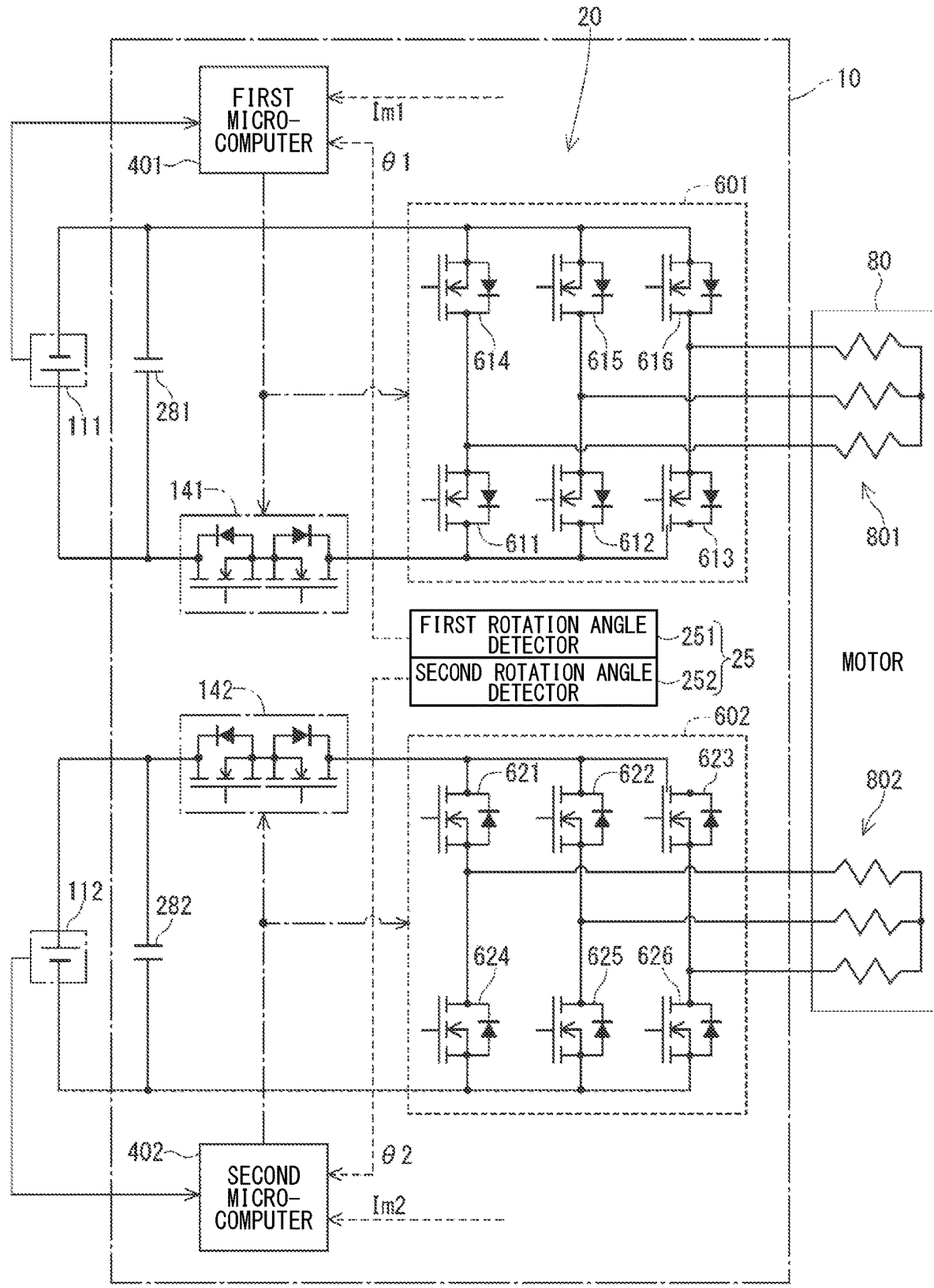
FIG. 5 is a circuit configuration view of the drive device according to a first embodiment.

FIG. 5 shows a circuit configuration of the drive device 1. The control unit 20 is a two-system motor control unit including two inverters 601, 602 as power converters and two microcomputers 401, 402. The control unit 20 is configured to control power supply to the motor 80 including two winding sets 801, 802. Here, a unit of the components including the winding set, the inverter and the microcomputer is defined as a "system".

In the present disclosure, the components or signals of the first system are distinguished by adding "first" or "first system" to the beginning of the word, and the components or signals of the second system are distinguished by adding "second" or "second system" to the beginning of the word. However, when not necessary, "first, second" and "first system, second system" are not attached to the common features in each system. Also, except for component of switching elements and connector unit, the reference numerals of the components or signals of the first system are appended with numeral "1", and the components of the second system or signals are appended with numeral "2".

The control unit 20 includes inverters 601, 602, power supply relays 141, 142, rotation angle detectors 251, 252, and microcomputers 401, 402. In the first embodiment, electric power is supplied from the two power supplies 111 and 112 to each system.

Each of the inverters 601 and 602 has six switching elements 611 to 616 and 621 to 626, such as MOSFETs, for example, which are bridge-connected. In the first system, the first inverter 601 performs a switching operation by a drive signal applied from the first microcomputer 401, converts DC power of the first power supply 111, and supplies the DC power to the first winding set 801. In the second system, the second inverter 602 performs a switching operation according to a drive signal applied from the second microcomputer 402, converts DC power of the second power supply 112, and supplies the DC power to the second winding set 802.

The power supply relays 141 and 142 are provided on the power supply lines of the input sides of the inverters 601 and 602, respectively. The power supply relays 141 and 142 illustrated in FIG. 5 include a protection function at the time of reverse connection of a power supply, in which two switching elements having parasitic diodes opposite to each other are connected in series. However, the power supply relay may be configured by one switching element or a mechanical relay that does not include a reverse connection prevention function. In addition, smoothing capacitors 281 and 282 are provided at the input sides of the inverters 601 and 602, respectively. The capacitors 281 and 282 smoothen an input power supplied from power supply batteries and prevent noise generated and flowing out due to the switching operation or the like of the switching elements, respectively. The capacitors 281 and 282 form a filter circuit together with an inductor (not shown).

The first rotation angle detector 251 detects an electrical angle θ1 of the motor 80 and outputs it to the first microcomputer 401. The second rotation angle detector 252 detects an electrical angle θ2 of the motor 80 and outputs it to the second microcomputer 402. The first rotation angle detector 251 has a power supply line and a signal line that are independent of the second rotation angle detector 252. The first rotation angle detector 251 and the second rotation angle detector 252 are both packaged to form the rotation angle sensor 25.

The first microcomputer 401 calculates a drive signal for instructing the first inverter 601 based on the feedback information such as the steering torque trq1, the current Im1, and the rotation angle θ1. The second microcomputer 402 calculates a drive signal to instruct the second inverter 602 based on feedback information such as the steering torque trq2, the current Im2, and the rotation angle θ2.

Figure 6:
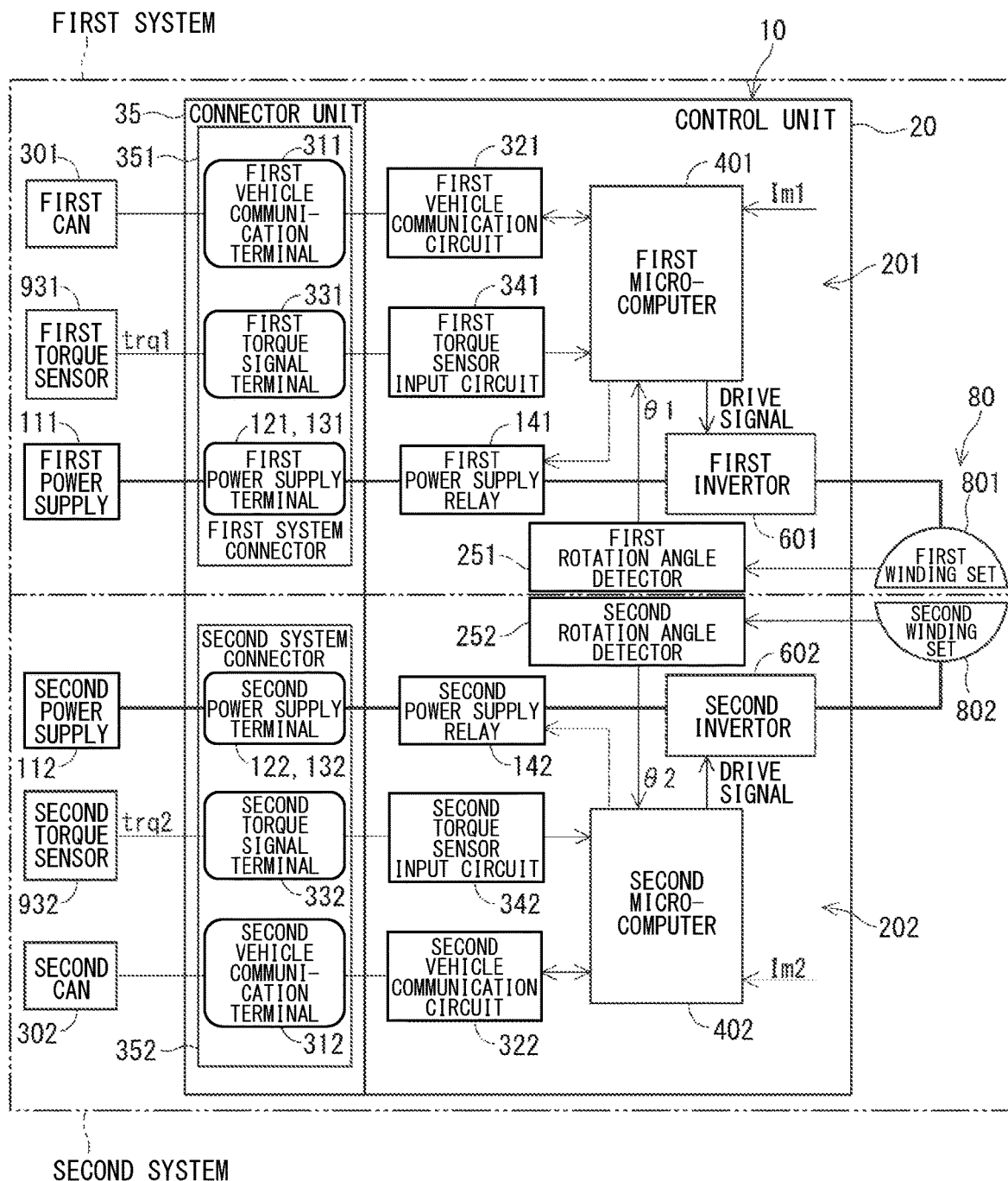
FIG. 6 is a control block diagram of the drive device according to the first embodiment.

FIG. 6 shows a control configuration of the drive device 1. In FIG. 6, the first system and the second system, respectively, are formed of two independent sets of element groups in a duplicated system. In the control unit 20, each electronic component of the first system that controls the energization of the winding set 801 constitutes a first system control unit 201. In the control unit 20, each electronic component of the second system that controls the energization of the winding set 802 constitutes a second system control unit 202.

The connector unit 35 includes a first system terminal group connected to the first system control unit 201, the first system connector 351 that holds the first system terminal group, a second system terminal group connected to the second system control unit 202, and a second system connector 352 that holds the second system terminal group.

The first system terminals include first power supply terminals (that is, first power supply bus bars) 121 and 131 for supplying power to the first system control unit 201, and a first vehicle communication terminal 311 and a first torque signal terminal 331 for inputting signals to the first system control unit 201. The second system terminals include second power supply terminals (that is, second power supply bus bars) 122 and 132 for supplying power to the second system control unit 202, and a second vehicle communication terminal 312 and a second torque signal terminal 332 for inputting signals to the second system control unit 202.

The first power supply terminals 121 and 131 are connected to the first power supply 111. The power of the first power supply 111 is supplied to the first winding set 801 via the first power supply terminals 121 and 131, the first power supply relay 141, and the first inverter 601. Further, the power of the first power supply 111 is also supplied to the first microcomputer 401 and the sensors of the first system.

The second power supply terminals 122 and 132 are connected to the second power supply 112. The power of the second power supply 112 is supplied to the second winding set 802 via the second power supply terminals 122 and 132, the second power supply relay 142, and the second inverter 602. The power of the second power supply 112 is also supplied to the second microcomputer 402 and the sensors of the second system.

When CAN is redundantly provided as a vehicle communication network, the first vehicle communication terminal 311 is connected between the first CAN 301 and the first vehicle communication circuit 321. The second vehicle communication terminal 312 is connected between the second CAN 302 and the second vehicle communication circuit 322. When the CAN is not redundantly provided, the vehicle communication terminals 311 and 312 of the two systems may be connected to the common CAN. Further, as a vehicle communication network other than CAN, any standard network such as CAN-FD (CAN with Flexible Data rate) or FlexRay may be used.

The first torque signal terminal 331 is connected between the first torque sensor 931 and the first torque sensor input circuit 341. The first torque sensor input circuit 341 notifies the first microcomputer 401 of the steering torque trq1 detected by the first torque signal terminal 331. The second torque signal terminal 332 is connected between the second torque sensor 932 and the second torque sensor input circuit 342. The second torque sensor input circuit 342 notifies the second microcomputer 402 of the steering torque trq2 detected by the second torque signal terminal 332.

The microcomputers 401 and 402 can exchange information with each other by communication between the microcomputers. When an abnormality has occurred in one system, the control unit 20 continues the motor control with the other normal system.

Figure 7:
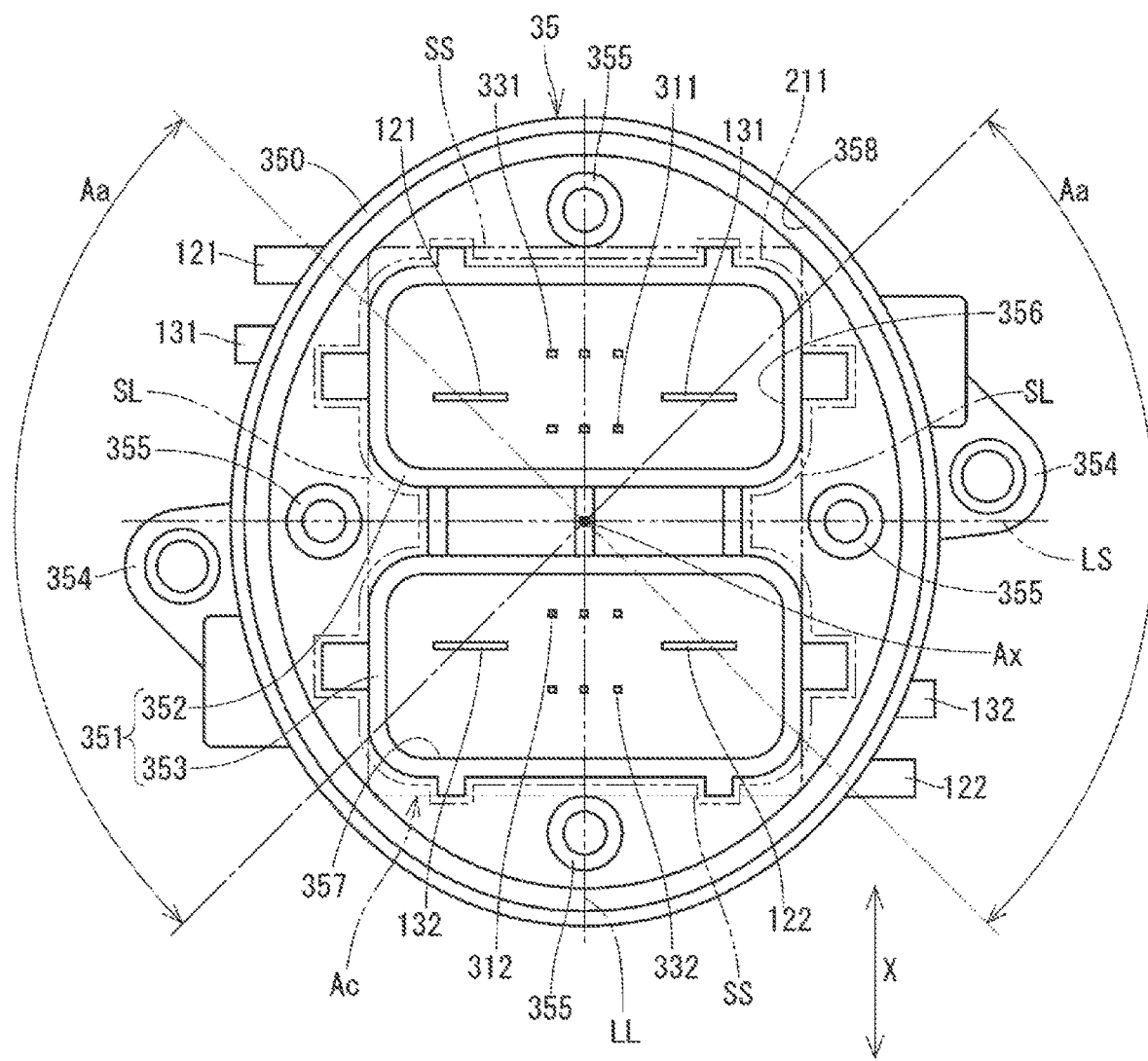
FIG. 7 is a top view of a connector unit of the drive device according to the first embodiment, and is a view as seen from arrow VII of FIG. 2.

FIGS. 2, 3 and 7 show the configuration of the connector unit 35. Hereinafter, a direction parallel to the axial Ax of the motor 80 will be referred to as an "axial direction". Hereinafter, a direction orthogonal to the axis Ax of the motor 80 will be referred to as a "radial direction".

The connector unit 35 includes a base portion 350, a connector portion 351, a connector fixing portion 354, a cover fixing portion 355, and each system terminal group. The base portion 350 is provided inside an opening 211 of the cover 21. The connector portion 351 has two connectors 352 and 353. The connectors 352 and 353 protrude in the axial direction from the base portion 350 to the outside of the cover 21 through the opening 211.

The first system connector 352 includes a connection opening 356 to the external connector 161. The first power supply terminals 121 and 131, the first vehicle communication terminal 311 and the first torque signal terminal 331 are arranged in the connection opening 356. The second system connector 353 includes a connection opening 357 to the external connector 162. The second power supply terminals 122 and 132, the second vehicle communication terminal 312 and the second torque signal terminal 332 are arranged in the connection opening 357.

The connector fixing portion 354 is formed so as to protrude outward in the radial direction from the base portion 350. The connector unit 35 is fixed to the heat sink 245 by a screw 157 through which the connector fixing portion 354 is inserted. The cover fixing portion 355 is formed on the outer side in the radial direction with respect to the connector portion 351 of the base portion 350. The cover 21 is fixed to the cover fixing portion 355 by a screw 155.

When the number of terminals of the connector unit is increased by, for example, increasing the input signal from the outside to the control unit, an extra space for arranging the increased terminal is required and an increase in a size of the connector unit. As a result, there is a difficulty that the size of the control device in the radial direction increases and the mountability of the drive device decreases. Further, since the conventional seal member has a deformed shape, it was necessary to adjust the direction at the time of assembly. In this embodiment, the following configuration is provided in order to solve the above difficulty.

As shown in FIG. 7, in a plane orthogonal to the axial direction, the base portion 350 has a shape elongated in a predetermined direction X. The two connectors 352 and 353 are arranged so as to be aligned in the longitudinal direction of the base portion 350 in the plane. The connector fixing portion 354 protrudes outward in the radial direction from the base portion 350 within an angle range Aa of ±45° about the rotation axis Ax with respect to the short axis LS of the base portion 350 in the plane. The fact that the connector fixing portion 354 is within the angle range Aa means that the connector fixing portion 354 is arranged closer to the short axis LS than the long axis LL of the base portion 350 in the plane. In the present embodiment, the connector fixing portion 354 is provided so as to overlap the short axis LS.

The base portion 350 has an elliptical shape in the plane. Further, a seal groove 358 having an elliptical shape for the seal member 22 is formed on the outer peripheral portion of the base portion 350 located outside the connection openings 356 and 357. A seal member 22 having a circular shape is housed in the seal groove 358.

Assuming that the area, which is seen from the axial direction, in which the connector portion 351 is arranged is defined as a connector arrangement area Ac, the connector arrangement area Ac has a shape that is longitudinal in the predetermined direction X. Specifically, the connector arrangement area Ac has a rectangular shape in the plane including a pair of long sides SL parallel to the long axis LL and a pair of short sides SS parallel to the short axis LS.

The cover fixing portion 355 is provided one by one between each of the long side SL and the seal member 22, and one by one between each of short side SS and the seal member 22. The four cover fixing portions 355 are arranged on the long axis LL and the short axis LS, and are provided at equal angular intervals around the rotation axis Ax.

Effects

As described above, in the first embodiment, the base portion 350 in the plane orthogonal to the axial direction has a shape elongated in a predetermined direction X. The connector fixing portion 354 protrudes outward in the radial direction from the base portion 350 within an angle range Aa of ±45° about the rotation axis Ax with respect to the short axis LS.

By arranging the connector fixing portion 354 outside of the seal member 22 as described above, the inside of the cover 21 can be made a waterproof structure. Further, the terminal arrangement space is increased by the base portion 350 having the shape elongated, and the connector fixing portion 354 is arranged closer to the short axis LS than the long axis LL. With this configuration, the entire connector unit 35 can be accommodated in the circular shape. Therefore, even when the number of terminals of the connector unit 35 increases, it is possible to suppress an increase in the size of the radial direction of the drive device 1. That is, by optimizing the arrangement of the base portion and the connector fixing portion and reducing the size in the radial direction of the drive device 1, the mountability can be improved.

Further, in the first embodiment, the base portion 350 in a plane orthogonal to the axial direction has an elliptical shape. Further, the seal groove 358 having the elliptical shape for the seal member 22 is formed on the outer peripheral portion of the base portion 350. With this configuration, a general-purpose O-ring can be used for the seal member 22, and it is not necessary to adjust the direction at the time of assembly.

In the first embodiment, assuming that the area, which is seen from the axial direction, in which the connector portion 351 is arranged is defined as a connector arrangement area Ac, the connector arrangement area Ac has a shape that is longitudinal in the predetermined direction X. As a result, the arrangement of the connector portion 351 is optimized with respect to the base portion 350 having the longitudinal shape, and the connector arrangement area Ac can be made as large as possible. In other words, by reducing the space between the cover fixing portion 355 and the connector arrangement area Ac, the size in the radial direction of the drive device 1 can be reduced.

In the first embodiment, the connector arrangement area Ac has a rectangular shape including a pair of long sides SL parallel to the long axis LL and a pair of short sides SS parallel to the short axis LS. As a result, the arrangement of the connector portion 351 is optimized with respect to the base portion 350 having the longitudinal shape, and the connector arrangement area Ac can be made as large as possible.

In the first embodiment, the cover fixing portion 355 is provided one by one between each of the long side SL and the seal member 22, and one by one between each of short side SS and the seal member 22. As a result, each cover fixing portion 355 can be arranged substantially evenly around the rotation axis Ax. Therefore, the waterproof property can be improved by uniformly compressing the seal member 22. Further, by arranging the cover fixing portion 355 closer to the center of the long side SL or the short side SS, the base portion 350 can be made as small as possible. As a result, the size in the radial direction of the drive device 1 can be reduced.

In the first embodiment, the two connectors 352 and 353 are arranged so as to be aligned in the longitudinal direction in the plane orthogonal to the axial direction. As a result, two connectors 352 and 353 having similar sizes can be arranged without waste in the longitudinal connector arrangement area Ac.

Second Embodiment

Figure 8:
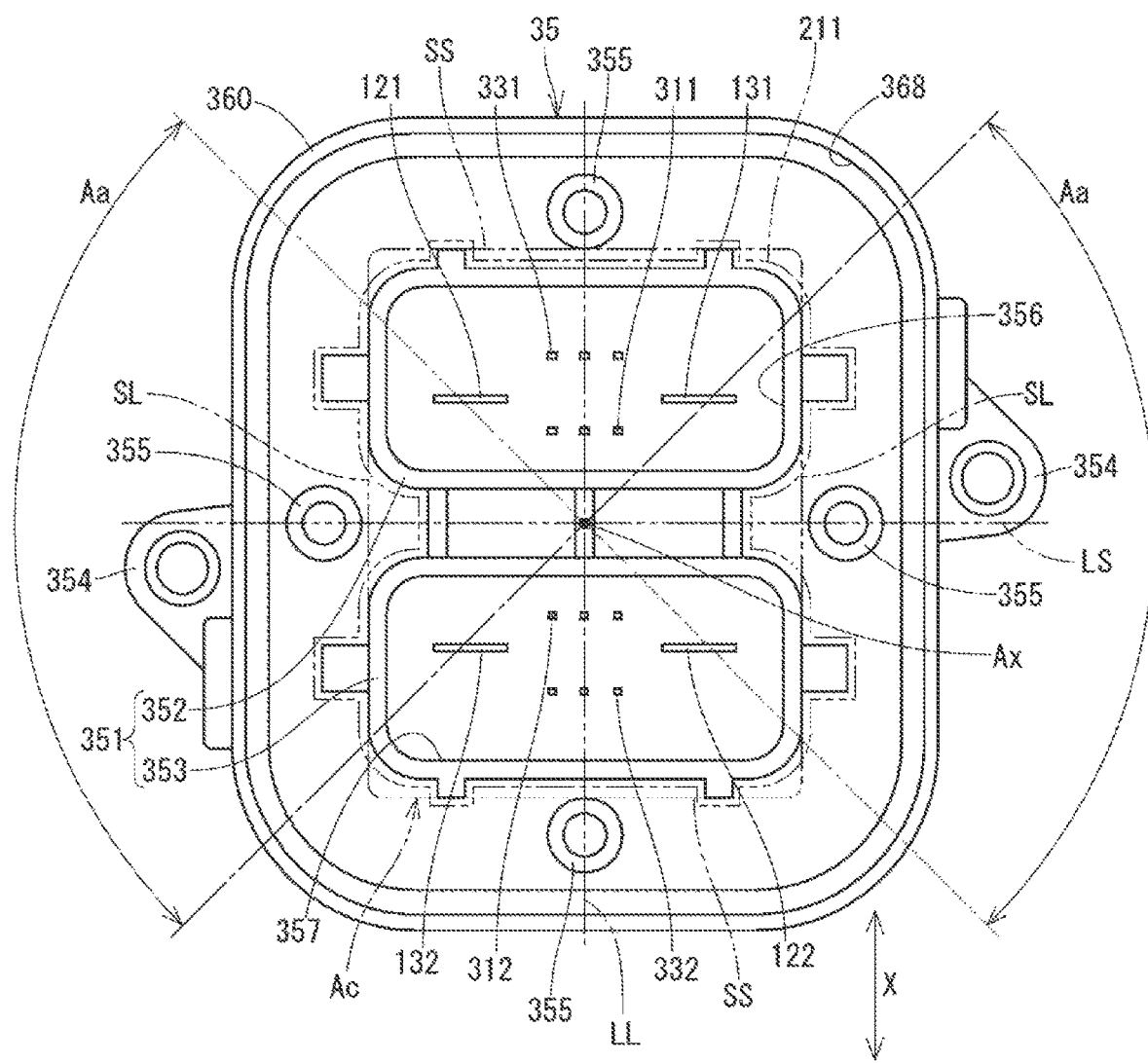
FIG. 8 is a top view of a connector unit of the drive device according to a second embodiment.

In a second embodiment, as shown in FIG. 8, a base portion 360 has a shape that is longitudinal in a predetermined direction X and has a rectangular shape with rounded corners. The seal groove 368 also has a rectangular shape with rounded corners. As described above, the base portion 360 is not limited to the elliptical shape, but may be rectangular shape. Except for the above, the second embodiment has the same configuration as the first embodiment, and has the same effects as the first embodiment.

Third Embodiment

Figure 9:
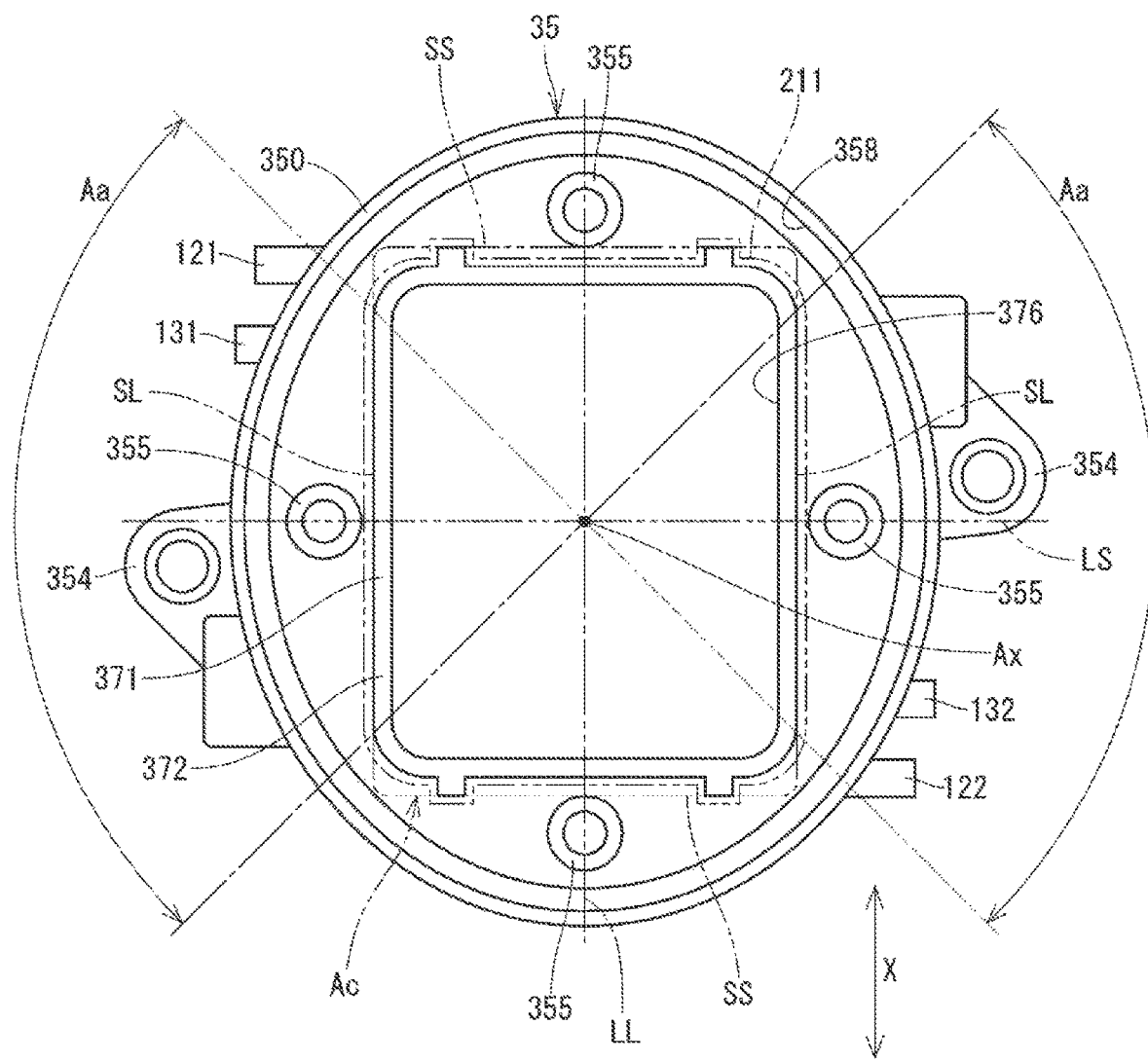
FIG. 9 is a top view of a connector unit of the drive device according to a third embodiment.

In a third embodiment, as shown in FIG. 9, a connector portion 371 has one connector 372. The connector 372 has a connection opening 376. In FIG. 9 and thereafter, the illustration of each system terminal is omitted. As described above, the number of connectors of the connector portion 371 is not limited to two, and may be one. Except for the above, the third embodiment has the same configuration as the first embodiment, and has the same effects as the first embodiment.

Fourth Embodiment

Figure 10:
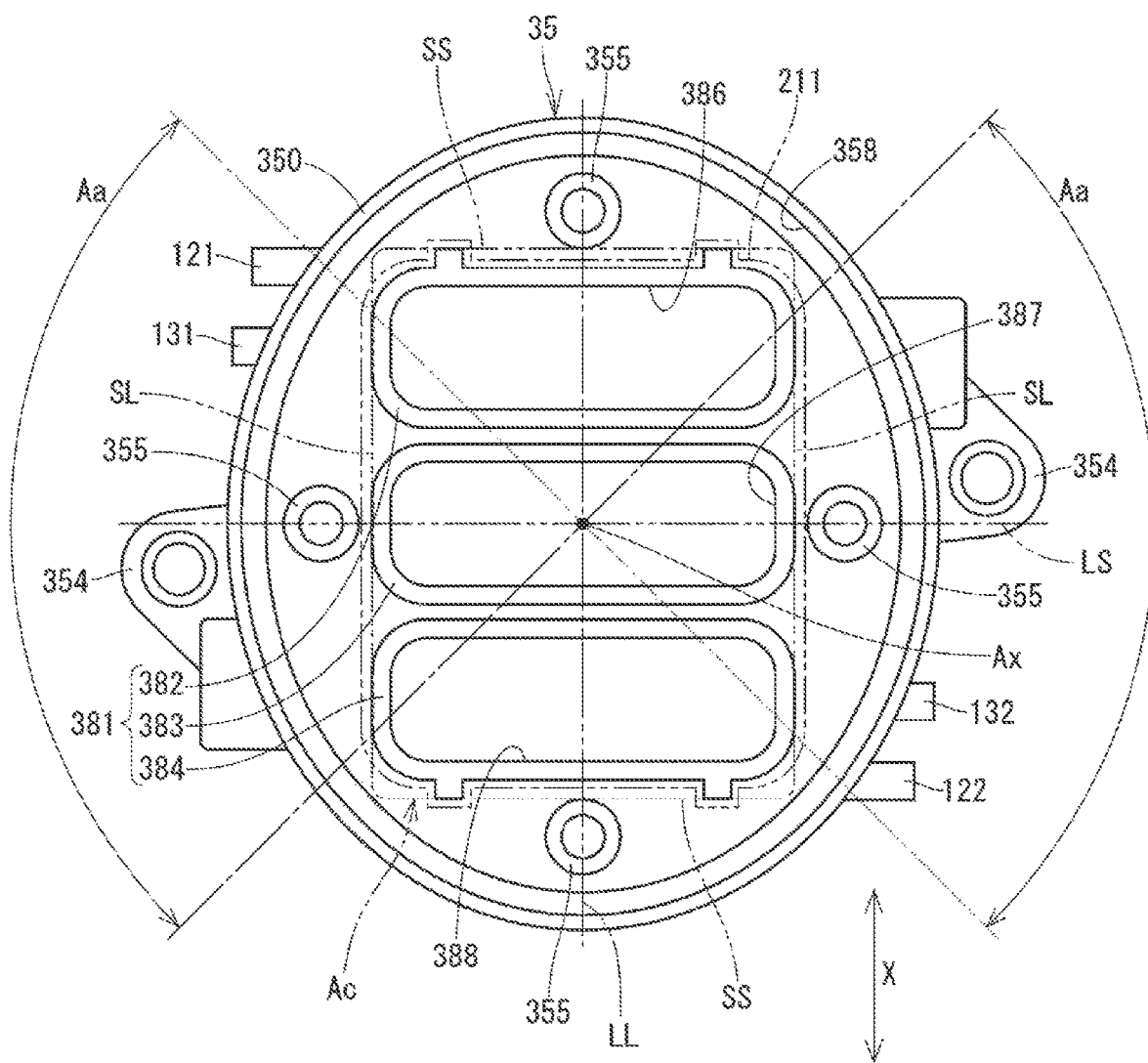
FIG. 10 is a top view of a connector unit of the drive device according to a fourth embodiment.

In a fourth embodiment, as shown in FIG. 10, a connector portion 381 has three connectors 382, 383, and 384. The connectors 382, 383, and 384 have connection openings 386, 387, and 388, respectively, and are arranged in the longitudinal direction. As described above, the number of connectors of the connector portion 381 is not limited to two, and may be three or four or more. Except for the above, the fourth embodiment has the same configuration as the first embodiment, and has the same effects as the first embodiment.

Fifth Embodiment

Figure 11:
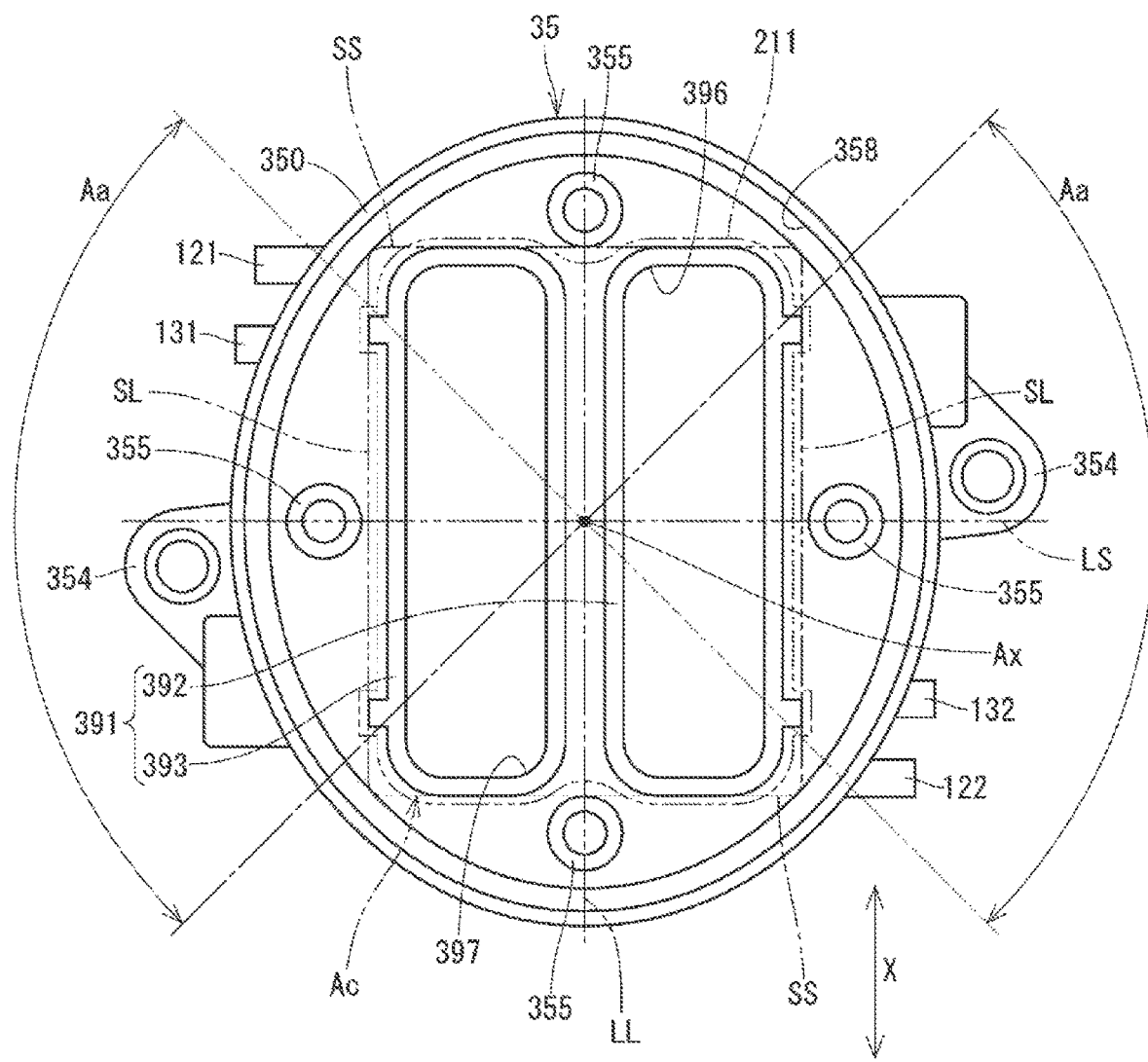
FIG. 11 is a top view of a connector unit of the drive device according to a fifth embodiment.

In a fifth embodiment, as shown in FIG. 11, a connector portion 391 includes two connectors 392 and 393. The connectors 392 and 393 have connection openings 396 and 397, respectively, and are arranged in the longitudinal direction. As described above, the arrangement direction of the connector portion 391 is not limited to the longitudinal direction, and may be the lateral direction or another direction. Except for the above, the fifth embodiment has the same configuration as the first embodiment, and has the same effects as the first embodiment.

Sixth Embodiment

Figure 12:
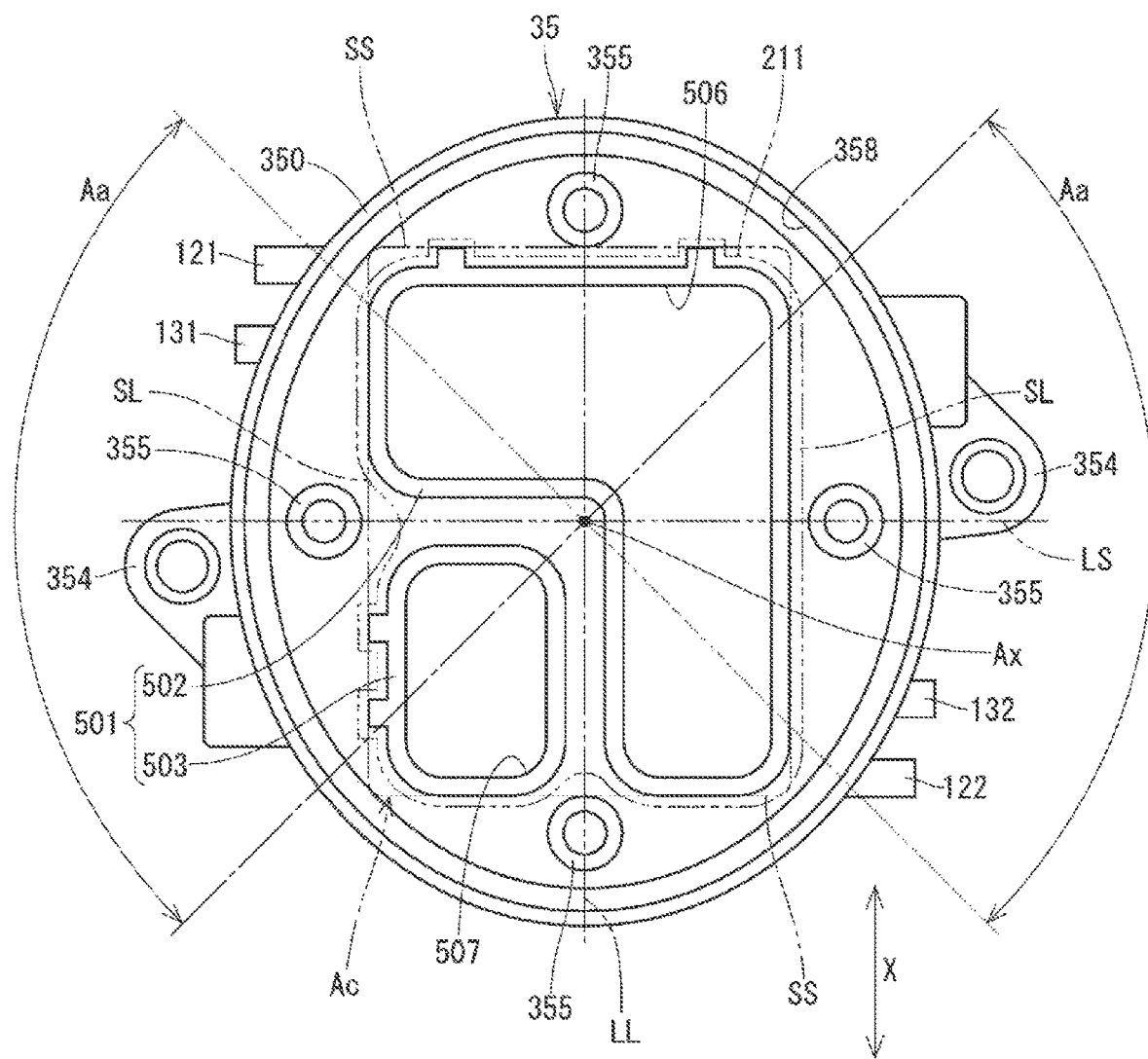
FIG. 12 is a top view of a connector unit of the drive device according to a sixth embodiment.

In a sixth embodiment, as shown in FIG. 12, a connector portion 501 has two connectors 502 and 503. The connectors 502 and 503 have connection openings 506 and 507, respectively. The connector 502 is greater than the connector 503 and has a different shape. The connector 502 has an L-shape, and the connector 503 has a rectangular shape. As described above, the size and shape of each connector of the connector portion 501 may be different. Except for the above, the sixth embodiment has the same configuration as the first embodiment, and has the same effects as the first embodiment.

Seventh Embodiment

Figure 13:
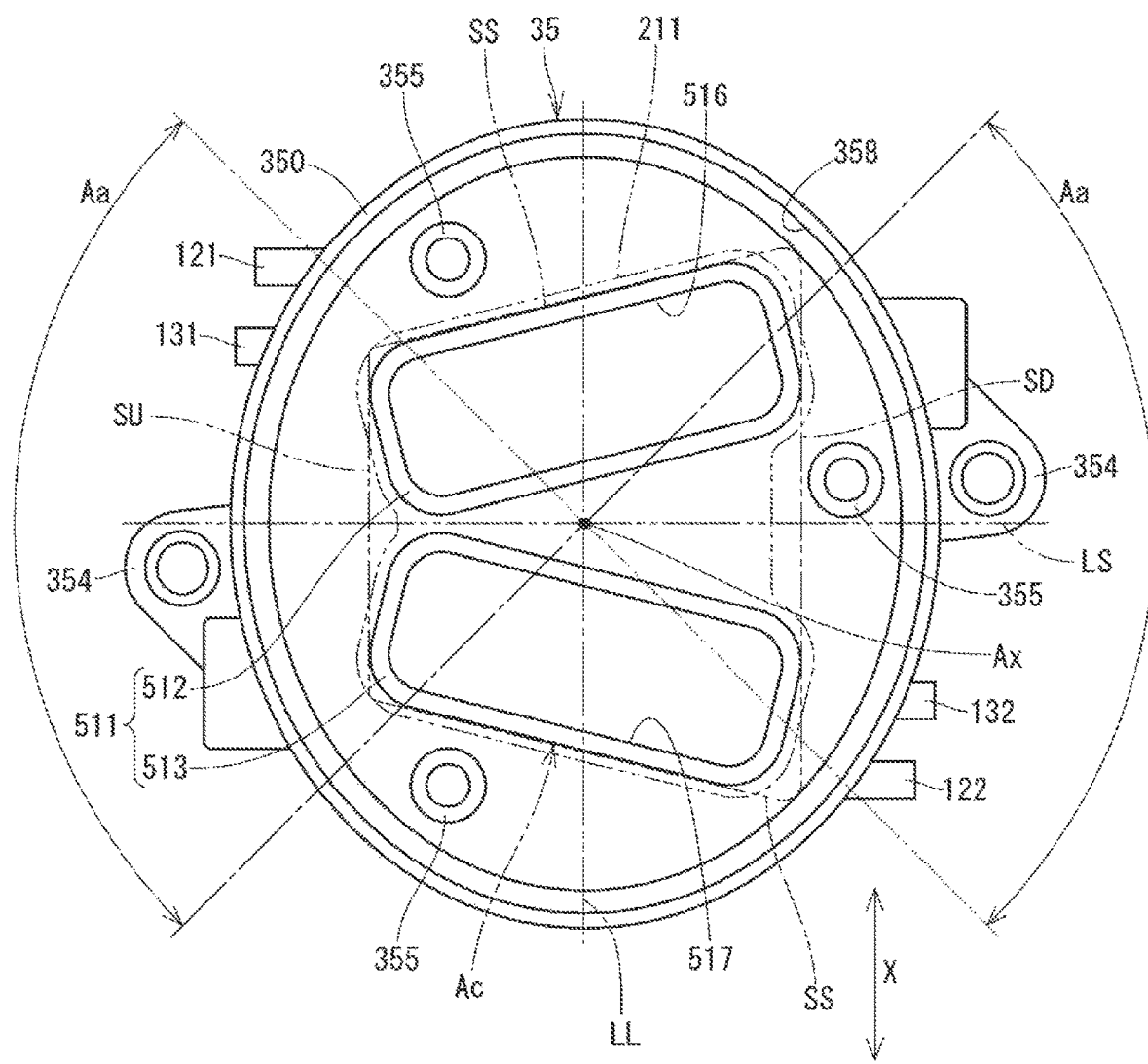
FIG. 13 is a top view of a connector unit of the drive device according to a seventh embodiment.

In a seventh embodiment, as shown in FIG. 13, a connector portion 511 has two connectors 512 and 513. The connectors 512 and 513 have connection openings 516 and 517, respectively. The connectors 512 and 513 are arranged on both sides of the short axis LS, and are arranged so that the longitudinal directions intersect each other. The connector arrangement area Ac has a shape elongated in a predetermined direction X, and has a trapezoidal shape including an upper base SU, a lower base SD, and two legs SS. The three cover fixing portions 355 are provided. One of the cover fixing portions 355 is arranged between one leg SS and the seal groove 358, another one of the cover fixing portions 355 is arranged the other leg SS and the seal groove 358, and the other one of the cover fixing portions 355 is between the lower base SD and the seal groove 358. As described above, the number of the cover fixing portions 355 is not limited to four, and may be three or five or more. Except for the above, the seventh embodiment has the same configuration as the first embodiment, and has the same effects as the first embodiment.

OTHER EMBODIMENTS

In other embodiments, the arrangement area of the connectors does not necessarily have a shape elongated in a predetermined direction, and may not have a rectangular shape.

In other embodiments, the motor may have two sets of windings arranged in same phase. Moreover, the number of phases of the motor is not limited to three phase and may be four phases or more. Further, the motor to be driven is not limited to the AC brushless motor but may be a DC motor with brushes. In that case, an H-bridge circuit may be used as the power converter. Further, in other embodiments, the drive device is not limited to the electric power steering device, and may be applied to any other application.

The present disclosure has been described on the basis of embodiments. However, the present disclosure is not limited to such embodiments and structures. The present disclosure also encompasses various modifications and variations within the scope of equivalents. Furthermore, various combination and formation, and other combination and formation including one, more than one or less than one element may be made in the present disclosure.

What is claimed is:

1. A drive device comprising:
   a motor;
   a control unit arranged coaxially with the motor and configured to control a drive of the motor;
   a connector unit configured to connect the control unit to an external connector;
   a cover that is a member separate from the connector unit and covers the control unit; and
   a seal member provided between the connector unit and the cover, wherein
   a direction parallel to a rotation axis of the motor is defined as an axial direction,
   a direction orthogonal to the rotation axis is defined as a radial direction,
   each of the control unit, the connector unit, and the cover is a member separate from a housing of the motor,
   each of the control unit, the connector unit, and the cover is arranged coaxially with the motor in the axial direction and arranged in one side with respect to the motor,
   the connector unit includes:
   a base portion provided in the cover and having a larger area, in a plane orthogonal to the axial direction, than an opening of the cover, wherein the plane, which is orthogonal to the axial direction, extends along the seal member and a contact surface of the base portion that is in contact with the cover in the axial direction,
   a connector portion that protrudes, in the axial direction, from the base portion to an outside of the cover through the opening, and has a connection opening for the external connector, a connector fixing portion that fixes the base portion to the housing or a member fixed to the housing, the axial direction is parallel to a thickness direction of a circuit board of the control unit, the base portion has an ellipse shape in the plane and includes a long axis and a short axis which are orthogonal to the axial direction and are also orthogonal to each other in the plane, and the ellipse shape of the base portion is elongated along the long axis, the seal member is received in a seal groove, wherein the seal groove is formed at the base portion and is shaped in an ellipse shape that is elongated along the long axis;

a length of the base portion measured along the long axis is longer than a length of the base portion measured along the short axis, the connector fixing portion protrudes outward from the base portion in the radial direction within an angle range of ±45° around the rotation axis with respect to the short axis of the base portion, the motor has a first winding set and a second winding set; the control unit includes:
- a first system control unit that includes a first inverter which is configured to energize the first winding set; and
- a second system control unit that includes a second inverter which is configured to energize the second winding set;

the connector unit includes:
- a first plurality of terminals which are configured to be coupled with the external connector to provide an electric power and a signal to operate the first inverter; and
- a second plurality of terminals which are configured to be coupled with the external connector to provide an electric power and a signal to operate the second inverter;

the second plurality of terminals are placed on one side of the first plurality of terminals in a direction along the long axis;

the connector portion includes:
- a first connector that holds the first plurality of terminals; and
- a second connector that holds the second plurality of terminals and is placed on the one side of the first connector and the first plurality of terminals in the direction along the long axis; and a size and a shape of the first connector are the same as a size and a shape of the second connector.

2. The drive device according to claim 1, wherein the seal groove is provided in an outer peripheral portion of the base portion located outside the connection opening.

3. The drive device according to claim 1, wherein an area where the connector portion is arranged in the plane is defined as a connector arrangement area, and the connector arrangement area has a shape elongated along the long axis.

4. The drive device according to claim 3, wherein the connector arrangement area has a rectangular shape provided by a pair of long sides parallel to the long axis of the base portion and a pair of short sides parallel to the short axis.

5. The drive device according to claim 4, wherein the connector unit further includes a plurality of cover fixing portions that fix the cover, the plurality of cover fixing portions are arranged inside the seal member in the radial direction, and the plurality of cover fixing portions are provided between each long side of the pair and the seal member and between each short side of the pair and the seal member.

6. The drive device according to claim 1, wherein the connector portion has a plurality of connectors arranged in a direction along the long axis.

7. The drive device according to claim 1, wherein:
the connector fixing portion is one of two connector fixing portions of the connector unit;

the one of the two connector fixing portions is only one connector fixing portion that is present on one side of the long axis in a view taken in the axial direction, and another one of the two connector fixing portions is only one connector fixing portion that is present on another side of the long axis, which is opposite to the one side of the long axis, in the view taken in the axial direction; and each of the two connector fixing portions touches and is entirely placed within a circle centered on the rotation axis.

8. The drive device according to claim 1, wherein the connector portion has a plurality of connectors that are spaced apart from each other in a direction along the long axis.

* * * * *